April 21, 1925.
J. MAZEAU
1,534,801
RAIL CAR MOTIVE MEANS
Filed March 6, 1923
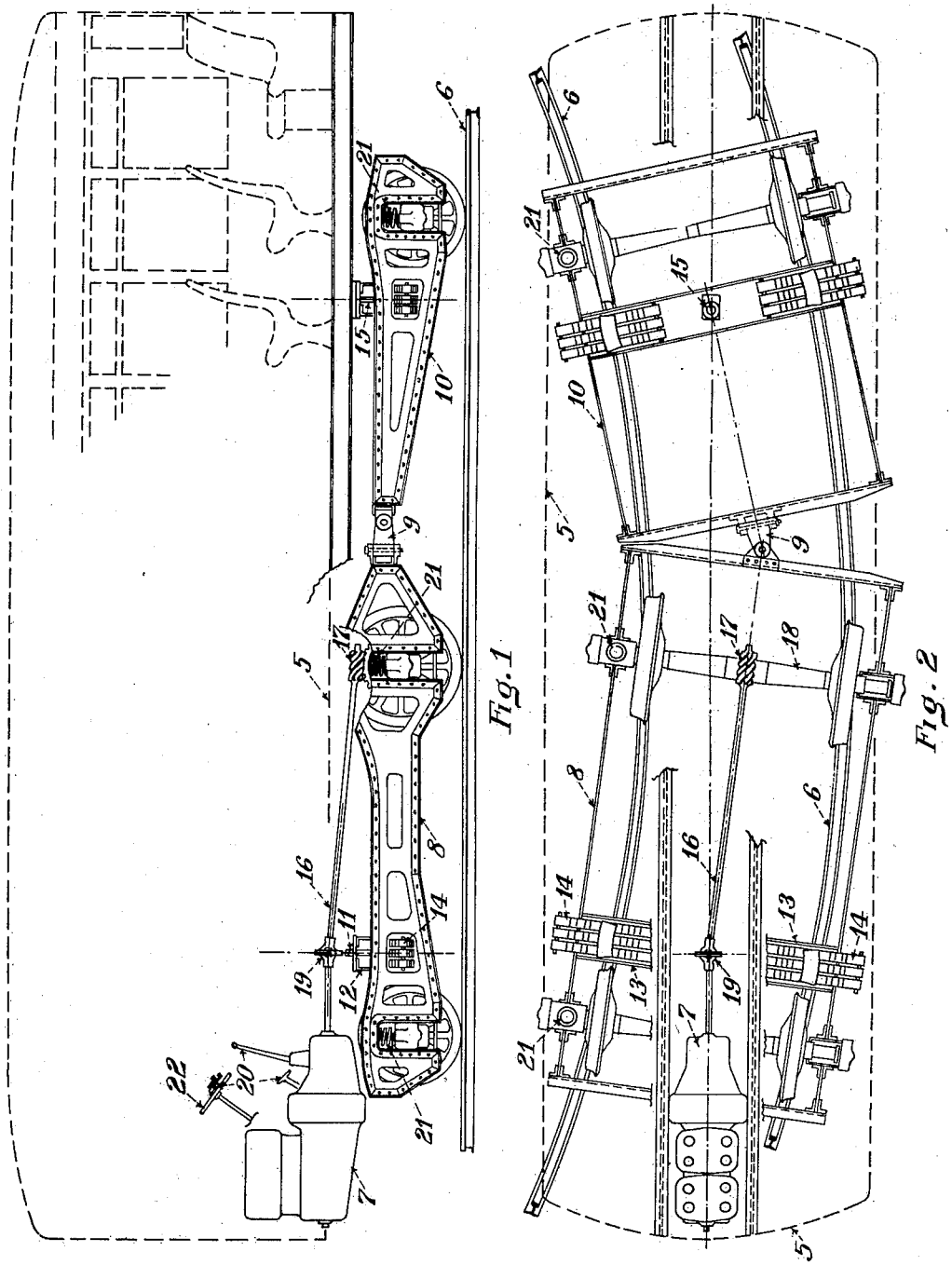

Patented Apr. 21, 1925.

1,534,801

UNITED STATES PATENT OFFICE.

JULIAN MAZEAU, OF ELMHURST, NEW YORK.

RAIL-CAR MOTIVE MEANS.

Application filed March 6, 1923. Serial No. 623,113.

*To all whom it may concern:*

Be it known that I, JULIAN MAZEAU, a citizen of the United States, residing at Elmhurst, in the county of Queens and State of New York, have invented certain new and useful Improvements in Rail-Car Motive Means, of which the following is a specification.

This invention relates generally to the construction of motor cars of a type adapted for use on branch railroads where the volume of traffic does not warrant the use of multiple-car trains. The invention particularly relates to the effective utilization of motors of standard internal-combustion types for the propulsion of such rail cars.

In order to economically handle the traffic of relatively short branch railroad lines efforts are continuously being made to develop a self-propelled car combining the simple and economical automobile power plant with the more rigid and heavy construction required in equipment intended for use on railroads. No satisfactory rail car of this type has heretofore been developed because of various difficulties that have been encountered. The chief of these difficulties has been the problem of mounting a motor of this type on the framework of the car and providing a satisfactory driving connection between the motor and a suitably located driving axle in a relatively movable truck beneath the car.

The problem has been complicated because of the impracticability of employing a single rigid four-wheel truck which necessitates a short wheel base that limits the length of the car body to dimensions that are not adequate for the purpose. The resulting necessity for using an articulated or multiple-unit truck correspondingly increases the difficulty of providing a satisfactory driving connection between the motor on the car frame and a driving axle free to swing laterally with relation to the body as the car passes through curved sections of track.

The present invention provides for the use in rail cars of a standard type of internal-combustion motor such as has been successfully developed in the automotive field. In order to mount the motor in an accessible position on the car body and at the same time utilize the standard drive connections between such motors and the driven axles, I provide a truck construction of the substantial character demanded by approved railroad standards and in an articulated or multiple-unit form. For, example, an articulated construction may be used consisting of a rigid four-wheel or main truck and a two-wheel trailer truck joined to the main truck by a universal joint connection, each of the trucks having a pivotal or king-bolt connection with the overlying bed of the car body framework. With this construction the motor is mounted in the floor of the car body preferably adjacent the extreme forward end thereof and with the drive shaft extending rearwardly of the car for driving connection with the rearward axle of the main truck. The drive shaft which, like the motor, may be of a standard type known in the motor truck field, contains the usual universal-joint, and in order to neutralize the lateral swing of the rearward end of the drive shaft when the driving axle moves with relation to the car body in passing around a curve, the universal joint in the drive shaft is mounted directly above or in vertical alinement with the pivotal connection between the main truck and the body of the car.

It will be seen that the mounting of the universal joint in the drive shaft in alinement with the king bolt or pivotal connection between the main truck and the car body renders it possible to utilize in the new construction the transmission or propeller shaft drive heretofore universally used exclusively in automobile construction wherein it was necessary to provide for only vertical relative movement between the driven axle and the chassis or car body. By thus providing a common axis about which the main truck and also the axle-engaging end of the propeller shaft may swing laterally with relation to the car body when rounding curves, the automotive type of power plant and the rail car type of running gear can be effectively combined.

In the drawings in which a preferred form of the invention has been selected for illustration, Figure 1 is a view partly diagrammatic and partly in side elevation of a rail car construction embodying a preferred form of the invention.

Figure 2 is a plan view partly broken away for the purpose of clear illustration of the device shown in Figure 1.

Referring to the drawings for a more detailed description of the invention, a rail car of a convenient typical or standard size which may have, for example, a length of thirty feet, is shown at 5 on a curved section of track 6. In accordance with the invention a propulsion motor 7 of the internal-combustion engine type is employed and is mounted in the framework of the car body 5 in the extreme forward end of the floor portion thereof.

In order to provide an adequate truck construction for a rail car of the desired size and at the same time provide for an effective drive connection between the motor 7 and a driving wheel axle, I preferably employ a truck structure of the articulated type and consisting of a four-wheel forward unit 8 connected through a universal joint 9 with a two-wheel rear or trailer unit 10. The forward truck 8 is pivoted to swing laterally about a king bolt connection 11 between the body of the car and the truck bolster 12 mounted to float in a transverse channeled frame member 13 carried by the truck and in which suitable leaf springs 14 are mounted. In like manner the rear truck 10 is pivoted at 15 for lateral swing with relation to the car body, a slot being provided as indicated to permit of longitudinal movement of the rear truck with relation to the car body to accommodate the arcuate swing of the universal joint 9.

In order to utilize the standard longitudinally extending propeller or transmission shaft 16 of the motor 7 with the truck construction described, I so mount the motor that the rearwardly extending propeller shaft will form a driving connection at 17 with the rear axle 18 of the forward truck 8. In order to provide for the lateral swing of the rear portion of the transmission shaft with the corresponding movement of the driving axle, I mount the universal joint 19 in the transmission shaft directly over or in alinement with the king-bolt 11 about which the forward truck swings in its pivotal or swinging movement. It will be seen that this arrangement provides for a cooperative and mutual adaptation of the truck and the transmission shaft to the lateral curvature of the track rails and maintains an effective driving relation between the shaft and the driven axle.

It will also be seen that I have succeeded in providing the relatively long wheel-base necessary for stability and effective speeds and without an excessive out-swing of truck or car body on curved sections of track. At the same time the articulated or jointed connection between the two truck units adds to the safety of the construction, while the position of the driving axle substantially midway between the ends of the car facilitates the tractive effect.

Any suitable or desirable arrangement of controlling member may be provided adjacent the engine as at 20 and it will be clear that very little space is required for the driver thus diminishing by a minimum amount the useful loading space in the car. Any desired form of braking mechanism may be employed such mechanism forming no essential part of the invention herein described. In order to increase the comfortable riding qualities of the rail car described I prefer to use truck frames of a type including cushioning springs 21 as shown. Means for operating the braking mechanism may conveniently take the form of a hand wheel 22 which simulates the steering wheel construction of automobiles and is readily manipulated.

What I claim is:—

1. In a rail car, a truck having a pivotal connection with the body of the car, a motor mounted in the body of the car and having a transmission shaft extending longitudinally of the car for driving engagement with an axle journaled in the truck, and a universal joint in the transmission shaft mounted above and in alinement with the axis of said pivotal connection.

2. In a rail car, a four-wheeled truck having a pivotal connection with the body of the car, a motor of the internal-combustion type mounted in the body of the car and having a transmission shaft extending longitudinally of the truck for driving engagement with the axle in the truck furthest removed from the position of the motor, and a universal joint in said transmission shaft above and in vertical alinement with said pivotal connection between the truck and the body of the car.

3. In a rail car, a four-wheel truck having a pivotal connection with the forward end of the car and including a driving axle journaled therein substantially under the central portion of the car, a motor of the internal combustion engine type mounted in the body of the car at the forward end thereof, a transmission shaft extending rearwardly from the motor and having driving relation with said driving axle, and a universal joint in said transmission shaft above and in vertical alinement with said pivotal connection between the truck and the body of the car.

4. In a rail car, a four wheel truck having a pivotal connection with a forward end of the car and including a driving axle journaled therein substantially under the central portion of the car, a trailing truck having a pivotal connection with the rearward end of the car, a motor mounted in the body of the car at the forward end thereof, a transmission shaft extending rearwardly from the motor and having a driving connection with the driving axle, and a universal joint in said transmission shaft above and in vertical alinement with said pivotal connection between the truck and the body of the car.

5. In a rail car, a four-wheel truck having a pivotal connection with a forward end of the car and having a driving axle journaled therein under substantially the central portion of the car, a two-wheel trailing truck having pivotal connection with a rearward end of the car and a jointed connection with the forward truck, a motor of the internal combustion engine type mounted in the body of the car at the forward end thereof, a transmission shaft extending rearwardly from the motor and having a driving connection with the driving axle, and a universal joint in said transmission shaft above and in vertical alinement with said pivotal connection between the truck and the body of the car.

6. In a rail car, a four-wheel truck having a pivotal connection rearwardly of the front axle with a forward end of the car with the rear axle located under substantially the central portion of the car, and a two-wheel truck having a pivotal connection forwardly of the axle with the rearward portion of the car.

7. In a rail car, a four-wheel truck having a pivotal connection between a portion rearwardly of the front axle and a forward end of the car with the rearward axle located under substantially the central portion of the car, and a two-wheel truck having a pivotal connection forwardly of the axle with a rearward portion of the car and a universal-joint connection with the forward truck.

JULIAN MAZEAU.